US012477991B2

(12) United States Patent
Riedel et al.

(10) Patent No.: US 12,477,991 B2
(45) Date of Patent: Nov. 25, 2025

(54) INTERMEDIATE DRIVE ELEMENT FOR TOWED AGRICULTURAL IMPLEMENT

(71) Applicant: AGCO International GmbH, Neuhausen (CH)

(72) Inventors: Jürgen Riedel, Feucht (DE); Oliver Lott, Feucht (DE)

(73) Assignee: AGCO International GmbH, Neuhausen (CH)

( * ) Notice: Subject to any disclaimer, the term of this patent is extended or adjusted under 35 U.S.C. 154(b) by 782 days.

(21) Appl. No.: 17/664,651

(22) Filed: May 23, 2022

(65) Prior Publication Data

US 2022/0377984 A1  Dec. 1, 2022

(30) Foreign Application Priority Data

May 26, 2021  (GB) ...................................... 2107497

(51) Int. Cl.
*A01D 78/10*  (2006.01)
(52) U.S. Cl.
CPC ..... *A01D 78/1007* (2013.01); *A01D 78/1028* (2013.01)
(58) Field of Classification Search
CPC ............ A01D 78/1007; A01D 78/1028; A01D 78/1014; A01D 78/1057
See application file for complete search history.

(56) References Cited

U.S. PATENT DOCUMENTS

| 2,491,211 | A | * | 12/1949 | Rietz | A01D 78/02 254/423 |
| 4,026,093 | A | | 5/1977 | Maschf | |
| 4,723,404 | A | * | 2/1988 | Aron | A01D 78/1014 56/370 |
| 6,109,012 | A | | 8/2000 | Staal et al. | |
| 6,116,007 | A | * | 9/2000 | Eggena | A01D 34/64 56/15.8 |

(Continued)

FOREIGN PATENT DOCUMENTS

| DE | 102005035570 A1 | 3/2006 |
| EP | 1258187 A2 | 11/2002 |

(Continued)

OTHER PUBLICATIONS

UK Intellectual Property Office, Search report for UK Priority Application No. GB2107497.6, dated Nov. 18, 2021.

*Primary Examiner* — Joseph M Rocca
*Assistant Examiner* — Julia C Tran

(57) ABSTRACT

A towed agricultural implement including a support frame, with one end adapted for connection to a towing vehicle, a drive apparatus carried by the support frame, with one end of the drive adapted for connection to the towing vehicle, support arms carried from the support frame, where each of the support arms are moveable between a working position and a transport position, and each support arm includes at least one rotary rake adapted to be driven about a central rake axis, a drive arrangement connecting the rotary rake to the drive apparatus, and an intermediate drive element connecting the drive apparatus and the drive arrangement moveably supported from the support frame to ensure that a sufficient overall length is available for the displaceable arm drive arrangement in the transport position.

5 Claims, 8 Drawing Sheets

(56) References Cited

U.S. PATENT DOCUMENTS

2013/0312383 A1* 11/2013 Hoerner ............. A01D 78/1007
56/385
2016/0135369 A1    5/2016 Arnold et al.
2020/0260648 A1*  8/2020 Brooks .............. A01D 78/1028

FOREIGN PATENT DOCUMENTS

EP        1668977 A2 *  6/2006  ......... A01D 78/1042
EP        3180975 A1    6/2017

* cited by examiner

INTERMEDIATE DRIVE ELEMENT FOR TOWED AGRICULTURAL IMPLEMENT

FIELD

The present invention relates to a towed agricultural apparatus and in particular to a haymaking apparatus for raking cut crop into swaths or windrows.

BACKGROUND

It is known to provide towed agricultural apparatus in which rotors carried by displaceable arms rake cut crop into swaths or windrows. Such towed agricultural apparatus are designed to be towed by agricultural vehicles. The arms of the agricultural apparatus are deployed substantially parallel to a ground surface as crop is raked ("the working position") and are raised substantially parallel to one another when the towed agricultural apparatus is not being used to rake crop, for example when the agricultural apparatus is being towed on public roads between fields ("the transport position"). It a known difficulty that it is desirable to have the rotors work as wide a width of crop as possible, leading to a desire for displaceable arms of longer lengths, while at the same time the height of a towed agricultural apparatus with the arms in the transport position is subject to legal limits. It is further known problem that movement of the arms between the working position and transport position is constrained by the presence of required elements, such as a drivetrain extending between a body of the towed agricultural apparatus and the rotors on the displaceable arms.

SUMMARY

According to a first aspect of the present invention, a towed agricultural implement comprises
- a support frame one end of which is adapted for connection to a towing vehicle;
- a drive apparatus carried by the support frame, one end of the drive means being adapted for connection to the towing vehicle;
- support arms carried from the support frame, each of the support arms being moveable between a working position and a transport position;
- each support arm being provided with at least one rotary rake adapted to be driven about a central rake axis;
- a drive arrangement adapted to connect the at least one rotary rake to the drive apparatus carried on the support frame;
- characterised in that
- an intermediate drive element connecting the support frame drive apparatus and the drive arrangement is moveably supported from the support frame.

Preferably, the intermediate drive element is suspended from the support frame.

Preferably, the intermediate drive element is supported in a first raised position when the arm is in the working position and a second lowered position when the arm is in the transport position.

This has as an advantage that a sufficient overall length is available for the displaceable arm drive arrangement in the transport position.

Preferably, the intermediate drive element is suspended from the support frame by a biased frame element. Preferably the biased frame element is biased towards a raised position, in which the intermediate drive element is in the first raised position.

Preferably, the support frame is connected to the biased frame element by biasing elements.

More preferably, the support frame is also connected to the biased frame element by a pivot pin fixedly supported from the support frame and extending through a first end of the biased frame element. More preferably, a frame of the intermediate drive element is connected to a second end of the biased frame element.

Preferably, the biased frame element comprises upper and lower connecting elements, first ends of each of the upper and lower connecting elements being pivotally mounted to a bracket supported from the support frame. More preferably second ends of each of the upper and lower connecting elements are pivotally mounted to a bracket mounted to a frame of the intermediate drive element.

This has as an advantage that the biased frame element and the bracket mounted to the frame of the intermediate drive element ensure that the angular deflection of the intermediate drive element remains constant as the support arm is raised and lowered.

Preferably the support frame is provided with a resilient buffer element between the support frame and the intermediate drive element.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

For the purposes of clarity some elements of the towed agricultural implement are shown in some Figures though not in others.

Figure 1:
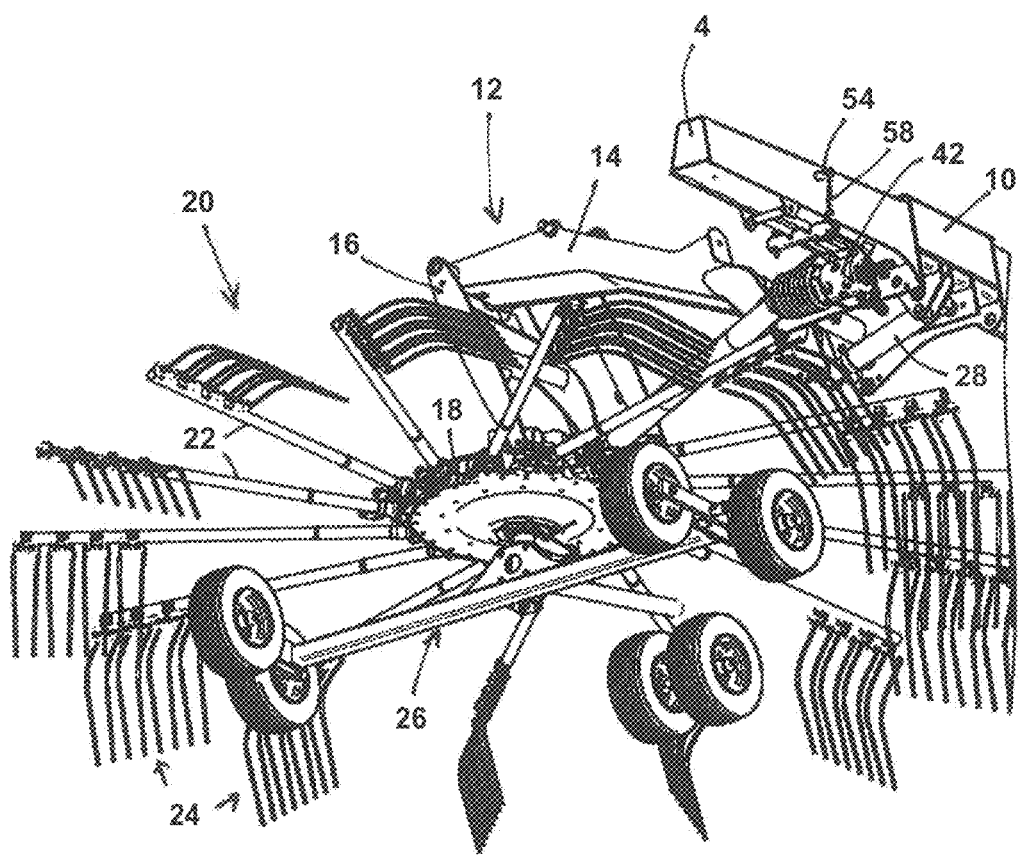
FIG. 1 shows a first perspective view of a first side of an agricultural apparatus in accordance with a first embodiment of the present invention.
Figure 2:
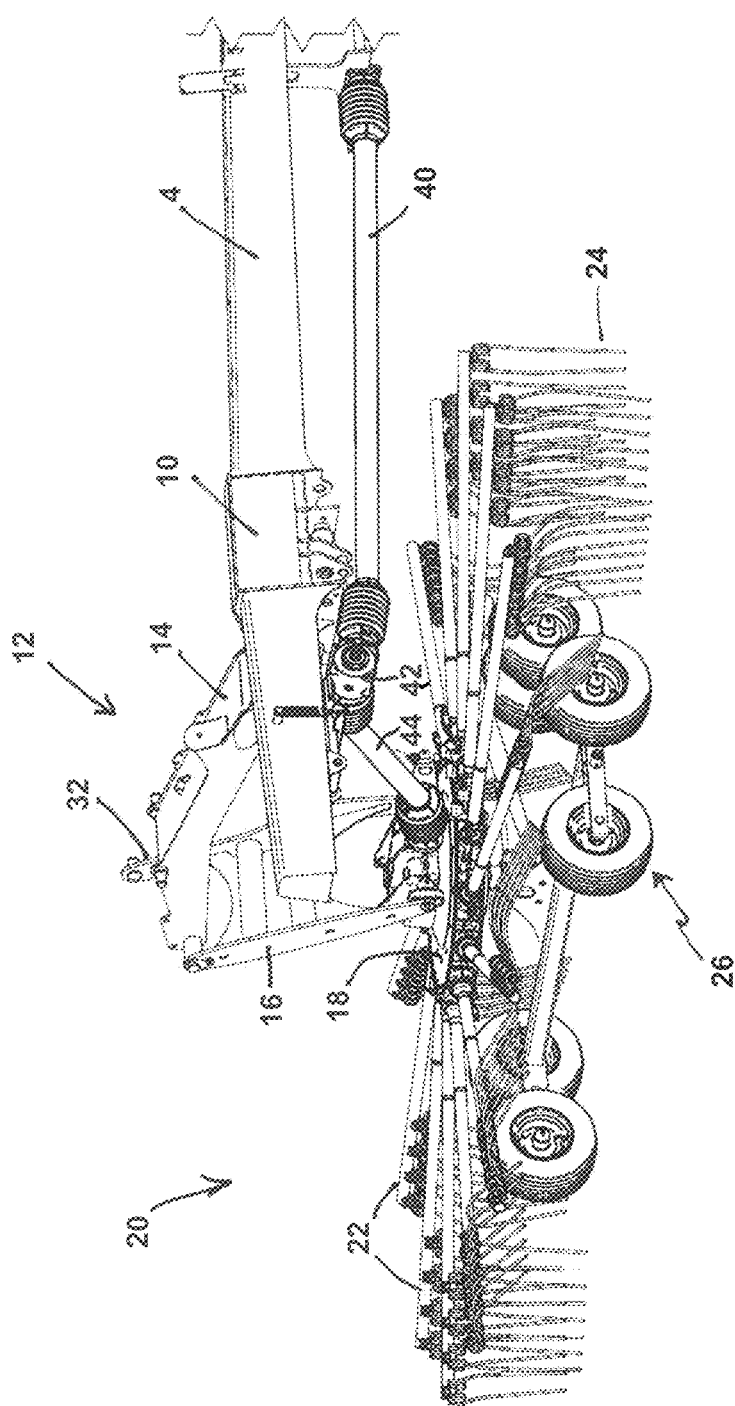
FIG. 2 shows a second perspective view of a first side of an agricultural apparatus in accordance with the first embodiment of the present invention, with the agricultural apparatus in a working position.
Figure 3:
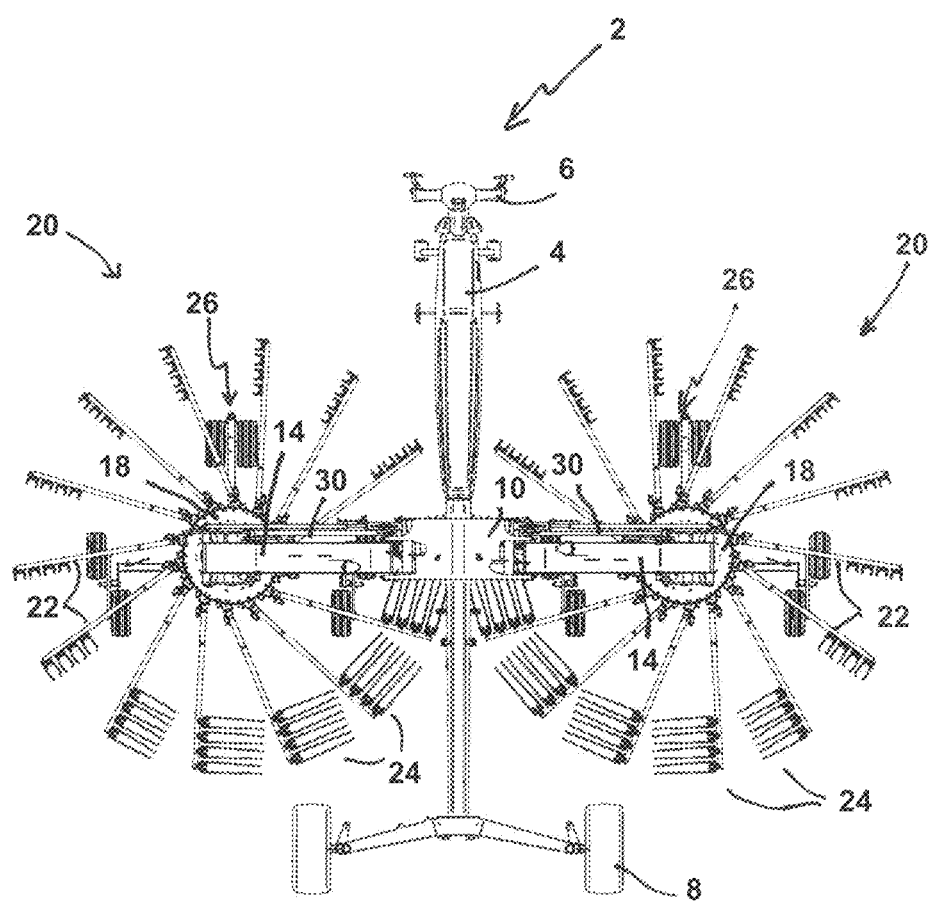
FIG. 3 shows a plan view of an agricultural apparatus in accordance with the first embodiment of the present invention.
Figure 4:
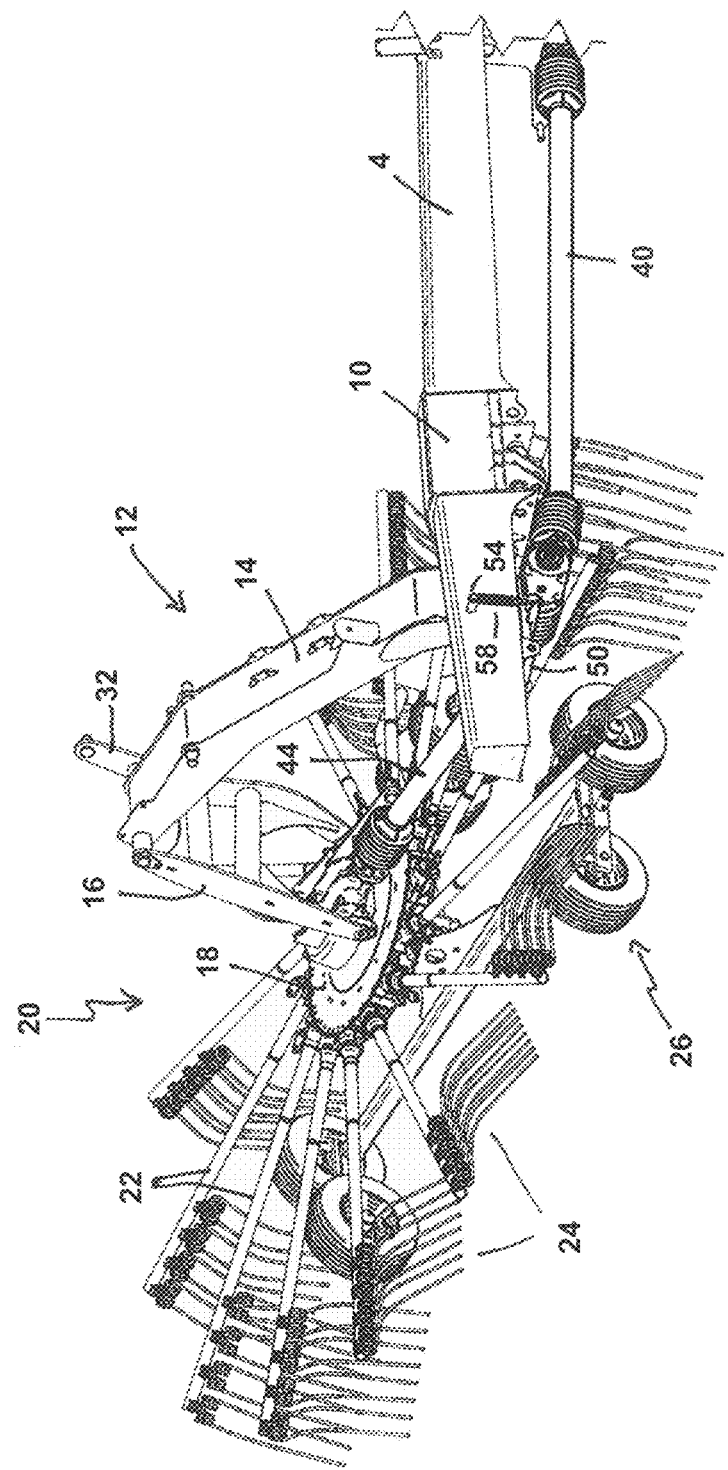
FIG. 4 shows a perspective view similar to FIG. 2, with the agricultural apparatus in a headland position.
Figure 5:
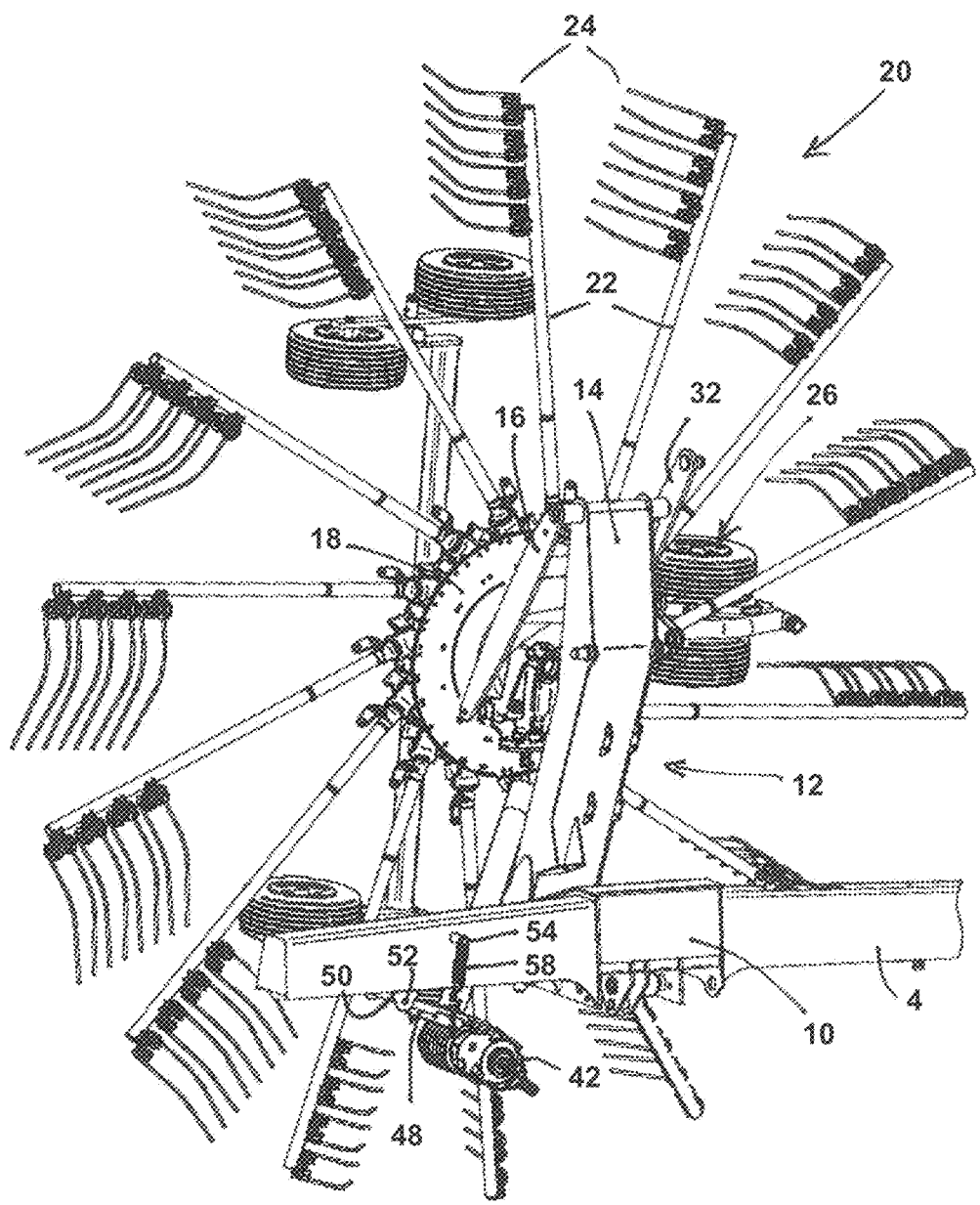
FIG. 5 shows a perspective view of one side of an agricultural apparatus in accordance with the first embodiment of the present invention, with the agricultural apparatus in a transport position.
Figure 6:
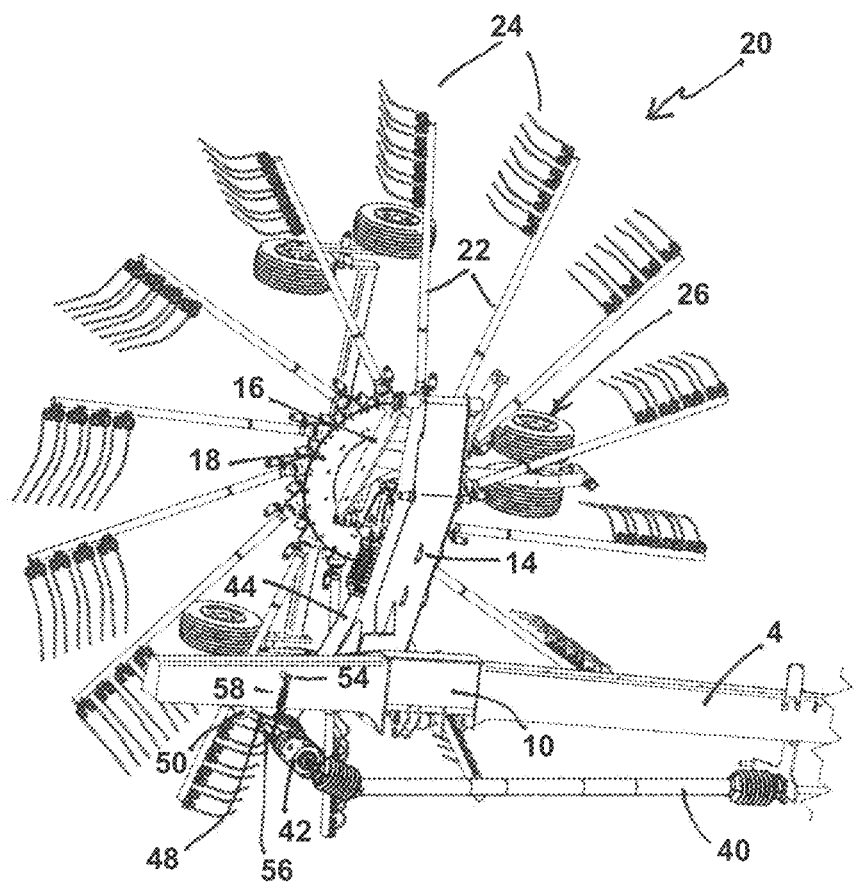
FIG. 6 shows a further perspective view of one side of an agricultural apparatus in accordance with the first embodiment of the present invention, with the agricultural apparatus in a transport position.

With reference to the Figures, a towed agricultural implement 2 suitable for raking cut crop into swaths or windrows is shown. As can most clearly be seen from FIG. 3, the towed agricultural implement 2 comprises a support frame 4 a first end of which is adapted for connection to a towing vehicle by way of a hitch arrangement 6. A second end of the support frame 4 is provided with ground engaging wheels 8 to support the towed agricultural implement 2 as it is being towed. In a middle region the support frame 4 is provided with a support portion 10.

As can be seen the towed agricultural implement 2 is substantially symmetrical about the support frame 4 and accordingly only one side of the towed agricultural implement will be described in detail, the other side being understood to correspond.

The support portion 10 of the towed agricultural implement 2 is provided to each side with a displaceable arm 12 moveable between a working position and a transport position. Each arm 12 is in two parts comprising a main portion 14 and a depending portion 16. The main portion 14 extends between a pivot mounting on the support portion 10 at a first end and a first end of the depending portion 16 at a second end. A second end of the depending portion 16 is connected to a central hub 18 of a rotary rake 20. The main portion 14 is further connected to the support portion 10 by way of a first displacement apparatus 28 mounted between the support portion 10 of the support frame 4 and the main portion 14 of the arm 12 to control pivoting movement of the main portion 14 of the arm 12 about the pivot mounting on the support portion 10 (best seen in FIG. 8 of the second embodiment). The first displacement apparatus 28 may take any form, for example a hydraulic actuator. Using the first displacement apparatus 28, the arm 12 may be controlled to adopt a working position in which the rotary rake moves the cut crop into swaths or windrows, a transport position or an intermediate headland position.

The central hub 18 of the rotary rake 20 carries a plurality of time arms 22 provided with sets of tines 24 depending from a distal end of each of the time arms. The tine arms 22 are arranged to travel along a cam path such that the sets of tines 24 are adapted to be raised and lowered as the tine arms 22 rotate around the central hub 18 during towing of the agricultural implement 2. The central hub 18 is further provided with a ground engaging wheel arrangement 26 to support the rake rotor in the working position. It will be appreciated that the wheel arrangement 26 will no longer be ground engaging when the rotary rake 20 is in the headland position or in the transport position.

A suitable second displacement apparatus 30 (FIG. 3) is located between the support portion 10 of the support frame 4 and an extension 32 extending upward from the first end of the depending portion 16. This allows controlled displacement of the rotary rake 20 away from the support frame 4 as required.

A drive apparatus 40 is carried by the support frame 4. The drive apparatus 40 is carried beneath the support frame 4. A first end of the drive apparatus 40 is supported by the hitch arrangement 6 and is adapted to be connected to the towing vehicle, in particular to the Power Take Off (PTO) of the towing vehicle. A second end of the drive apparatus 40 is connected to a first end of an intermediate drive arrangement 42. The drive apparatus 40 may take any convenient form, such as a Cardan shaft. The intermediate drive arrangement 42 may take any form, conveniently a gearbox.

A drive arrangement 44 is provided connected at a first end to the hub 18 of the rotary rake 20 and at a second end to a second end of the intermediate drive arrangement 42. The drive arrangement 44 may take any convenient form, such as a Cardan shaft.

In the working position, power is transmitted from the PTO of the towing vehicle through the drive apparatus 40, the intermediate drive arrangement 42 and the drive arrangement 44 to the rotary rake 20 in order to drive the time arms 22 about the hub 18 of the rotary rake 20.

A first embodiment of a support for the intermediate drive arrangement 42 is shown in FIGS. 1 to 6. The intermediate drive arrangement 42 is supported from the support frame 4 by way of a frame member 48. The frame member 48 comprises a parallel sided frame supported at a first end by a pivot bar 50. The pivot bar 50 is supported by brackets 52 extending from an underside of the support frame 4. The support frame 4 is further provided with mountings 54 extending from the sides of the support frame 4.

An outer casing of the intermediate drive element 42 is connected to the second end of the parallel sided frame. The parallel sided frame is provided with a cross member 56 extending across a mid-portion of the parallel sided frame. First and second ends of the cross member 56 extend beyond the sides of the parallel sided frame.

Biasing elements 58 extend on each side of the support frame 4 from the mountings 54 to the respective ends of the cross member 56. The biasing elements 58 conveniently take the form of springs.

In the working position of the rotary rake 2 (FIG. 2), the relative positions of the gear elements hold the parallel sided frame in a raised position with the intermediate drive element 42 held close to the underside of the support frame 4.

In moving to the headland position (FIG. 4), the second end of the drive arrangement 44 may pivot with respect to the second end of the intermediate drive element 42.

In moving to the transport position (FIG. 5), the second end of the drive arrangement 44 acts to push the second end of the intermediate drive element 42 downward. The biased frame member is deflected, the parallel sided frame pivoting about the pivot bar 50 to lower the end of the parallel sided frame connected to the intermediate drive element 42, such that the intermediate drive element 42 adopts a lowered transport position. In this way a sufficient overall length is provided for the drive arrangement 42 in the transport position.

Figure 7:
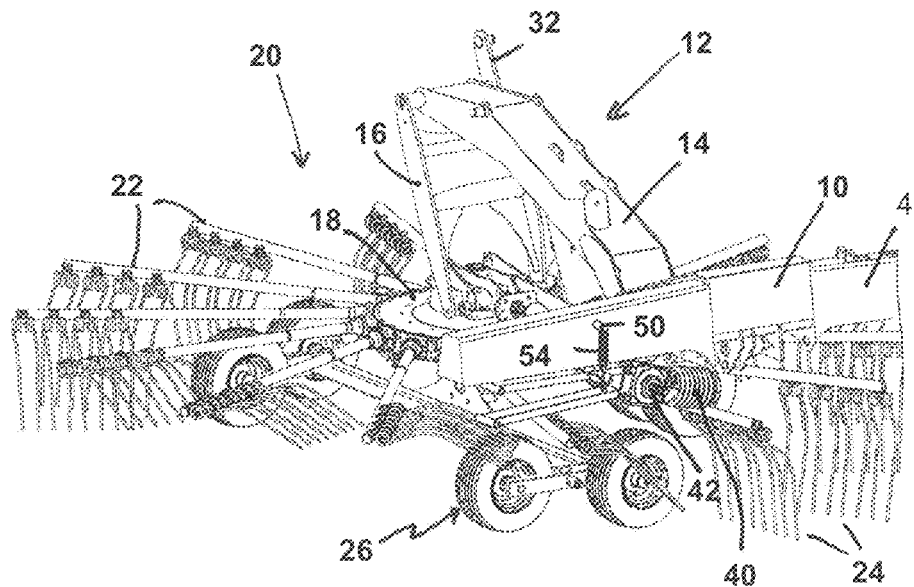
FIG. 7 shows a further perspective view of one side of an agricultural apparatus in accordance with a second embodiment of the present invention, with the agricultural apparatus in a working position.
Figure 8:
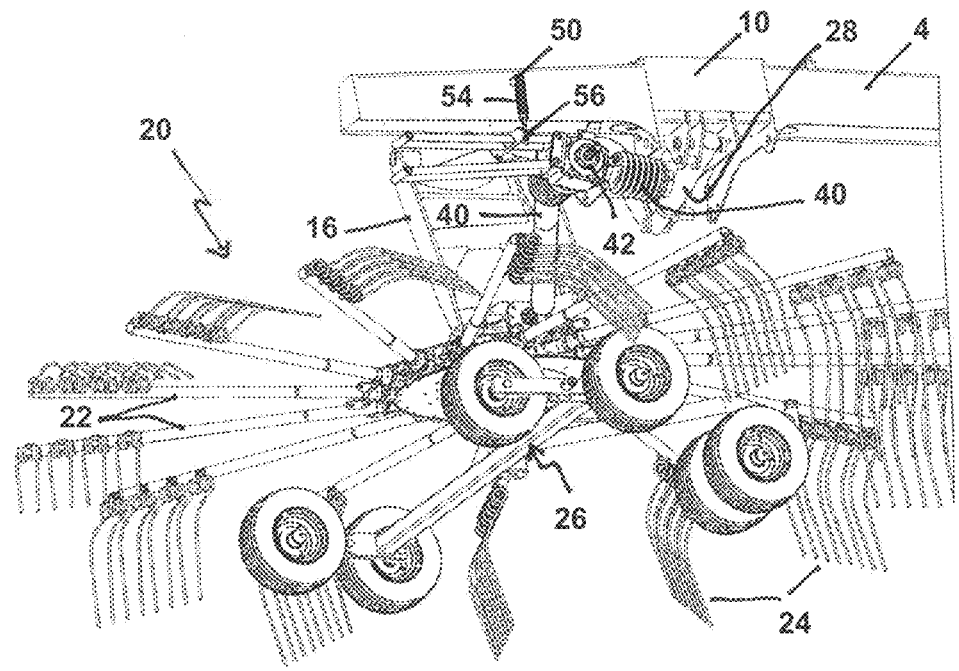
FIG. 8 shows further perspective view of the one side of an agricultural apparatus in accordance with the second embodiment of the present invention, with the agricultural apparatus in a working position.

In a second embodiment, shown in FIGS. 7 and 8, an alternative construction of the biased frame member is shown. In FIGS. 7 and 8 only a second end of the drive apparatus connected to the intermediate drive element is shown.

Figure 9:
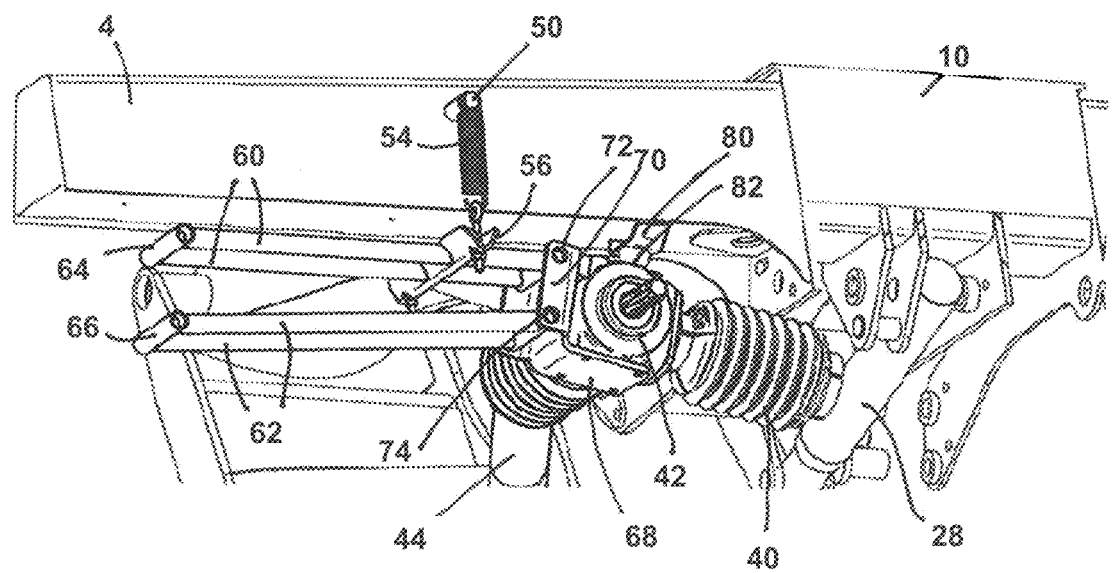
FIG. 9 is a detail of FIG. 8 showing the biased frame member of the second embodiment in more detail.

As may be most clearly seen in FIGS. 8 and 9, the biased frame member comprises upper and lower pairs of spaced apart members 60,62. The upper members 60 are connected at a first end to a first upper cross member 64. Similarly, the lower members 62 are connected at a first end to a first lower cross member 66. The upper and lower cross members 64,66 are vertically spaced from one another. The upper and lower cross members 64,66 are pivotally mounted in brackets 52 extending from an underside of the support frame 4.

A substantially L-shaped bracket 68 is provided to which the intermediate drive element 42 is mounted. An upright portion of the L-shaped bracket 68 is provided with a rearwardly directed flange 70 on each side. A second upper cross member 72 connects the second ends of the upper members 60 to the flanges 70. Similarly, a second lower cross member 74 connects the second ends of the lower members 62 to the flanges 70. The upper and lower cross members 64,66 are pivotally mounted the flanges 70.

The biased frame member, as in the previous embodiment, is provided with a cross member 56 extending across a mid-portion of the biased frame member. In the illustrated embodiment the cross member 56 is fixedly connected to the upper members 60 in any suitable manner. The cross member 56 extends across the upper members 60 of the biased frame member, between the biasing elements 58 depending from mountings 54 on the support frame 4.

It can be seen that the upper and lower members 60,62 together with the brackets 52 and the flanges 70 of the bracket 68 form a parallelogram arrangement such that in movement of the support arm between the working position and the transport position (and back again) the angular deflection of the intermediate drive element 42 (and in particular a front shaft of the intermediate drive element) remains constant.

Figure 10:
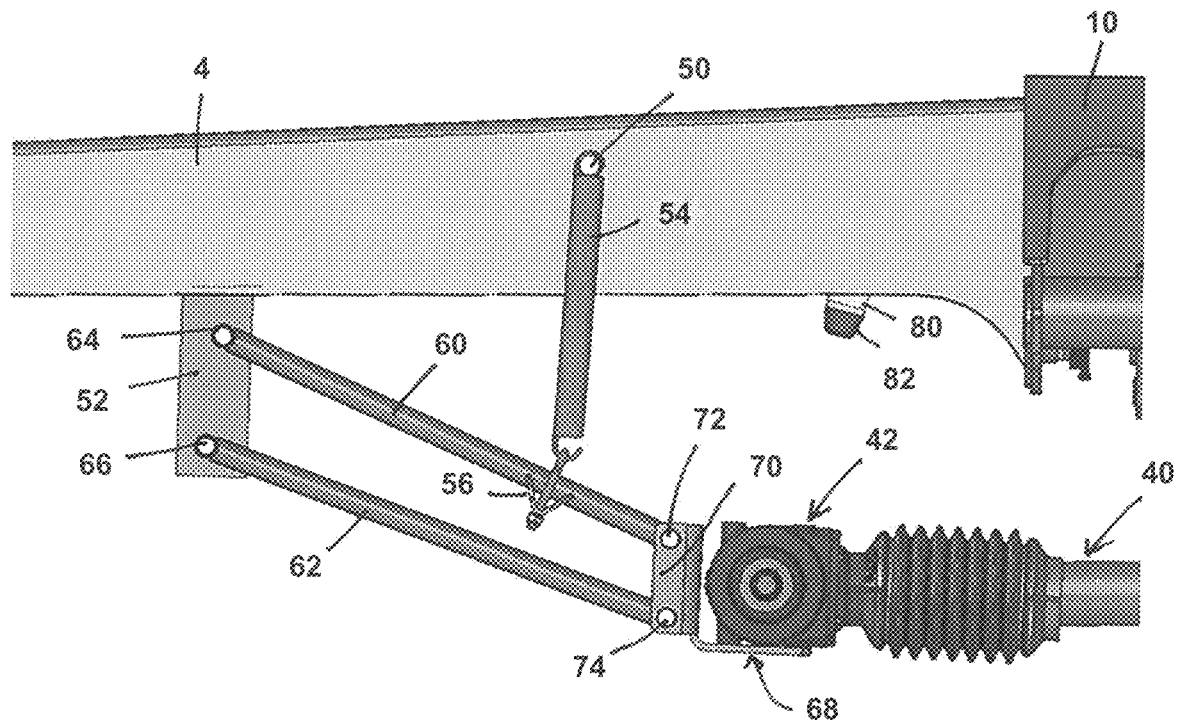
FIG. 10 shows a view similar to that of FIG. 9 where the elements have been displaced by movement of the support arm into the transport position.

Additionally, most clearly in FIGS. 9 and 10, the support frame 4 is provided with a further bracket 80 to which a resilient buffer 82 is secured. This acts as an end stop end stop for the intermediate drive element 42 as the displaceable arm 12 is lowered to the working position and the intermediate drive element 42 is raised towards the underside of the support frame 4.

From reading the present disclosure, other modifications will be apparent to persons skilled in the art. Such modifications may involve other features which are already known in the field of agricultural rakes and component parts therefore and which may be used instead of or in addition to features already described herein.

The invention claimed is:

1. A towed agricultural implement comprising:
   a support frame one end of which is adapted for connection to a towing vehicle;
   a drive apparatus carried by the support frame, wherein one end of the drive apparatus is adapted for connection to the towing vehicle;
   support arms carried from the support frame, wherein each of the support arms is moveable between a working position and a transport position and comprises at least one rotary rake adapted to be driven about a central rake axis;
   a drive arrangement adapted to connect the at least one rotary rake to the drive apparatus; and
   an intermediate drive element connecting the drive apparatus and the drive arrangement, moveably supported from the support frame, wherein the intermediate drive element is supported in a first raised position when the support arms are in the working position and a second lowered position when the support arms are in the transport position, wherein the intermediate drive element is suspended from the support frame by a biased frame element with the biased frame element being biased towards a raised position in which the intermediate drive element is in the first raised position, wherein the support frame is connected to the biased frame element by biasing elements, wherein the support frame is also connected to the biased frame element by a pivot pin fixedly supported from the support frame and extending through a first end of the biased frame element.

2. The towed agricultural implement of claim 1, wherein a frame of the intermediate drive element is connected to a second end of the biased frame element.

3. A towed agricultural implement comprising:
   a support frame one end of which is adapted for connection to a towing vehicle;
   a drive apparatus carried by the support frame, wherein one end of the drive apparatus is adapted for connection to the towing vehicle;
   support arms carried from the support frame, wherein each of the support arms is moveable between a working position and a transport position and comprises at least one rotary rake adapted to be driven about a central rake axis;
   a drive arrangement adapted to connect the at least one rotary rake to the drive apparatus; and
   an intermediate drive element connecting the drive apparatus and the drive arrangement, moveably supported from the support frame, wherein the intermediate drive element is supported in a first raised position when the support arms are in the working position and a second lowered position when the support arms are in the transport position, wherein the intermediate drive element is suspended from the support frame by a biased frame element with the biased frame element being biased towards a raised position in which the intermediate drive element is in the first raised position, wherein the support frame is connected to the biased frame element by biasing elements, wherein the biased frame element comprises upper and lower connecting elements, wherein first ends of each of the upper and lower connecting elements are pivotally mounted to a bracket supported from the support frame.

4. The towed agricultural implement of claim 3, wherein second ends of each of the upper and lower connecting elements are pivotally mounted to a bracket mounted to a frame of the intermediate drive element.

5. The towed agricultural implement of claim 2, wherein the support frame comprises a resilient buffer element between the support frame and the intermediate drive element.

* * * * *